March 22, 1927.
D. E. HENNESSY
BRANDING
Filed Aug. 21, 1922
1,621,587
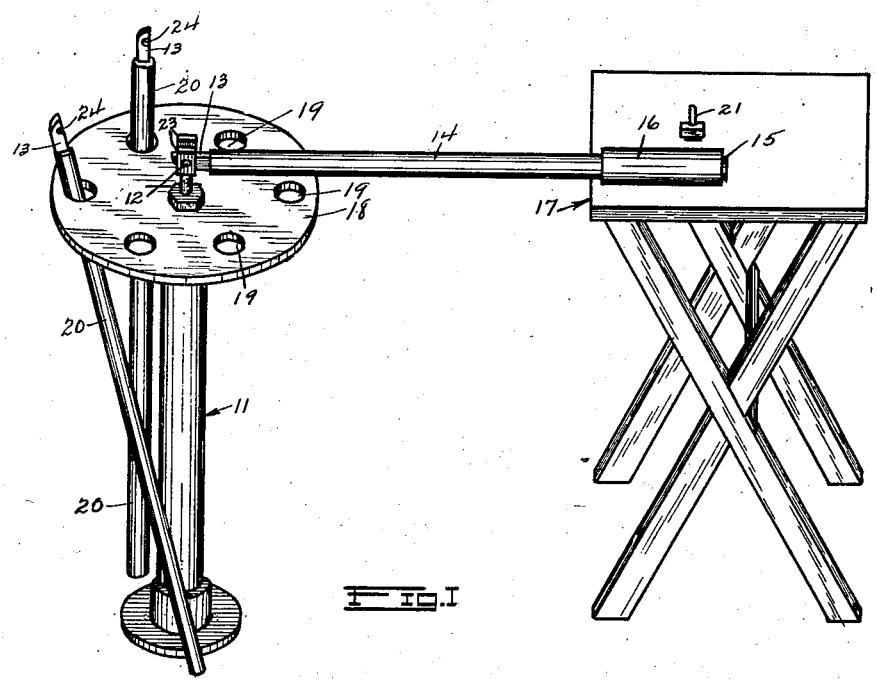
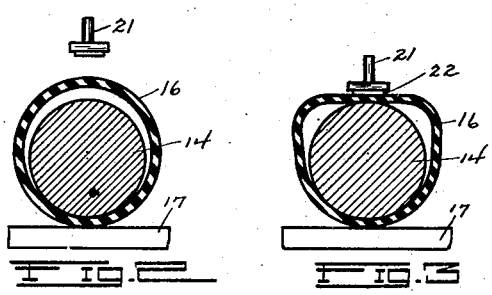
DANIEL E. HENNESSY
INVENTOR
ATTORNEY Patented Mar. 22, 1927.

1,621,587

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BRANDING.

Application filed August 21, 1922. Serial No. 583,418.

My invention relates to branding tubes and the principal object of my invention is to provide a new and improved method of and means for branding all sizes of tubes. In the drawings accompanying this specification and forming a part thereof I have shown, for purposes of illustration, one form which my invention may assume. In these drawings:—

Figure 1 is a perspective view of this illustrative embodiment.

Figure 2 is a cross-sectional view showing the tube mounted upon a mandrel in position to be stamped, while Figure 3 is a cross-sectional view of the tube mounted on a mandrel showing the tube flattened during the stamping thereof.

The device herein shown comprises a stand 11 carrying a bar 12 adapted to support one end 13 of a mandrel 14 the other end 15 of which is adapted to receive the tube 16 and rest upon any suitable support such as the table 17. The stand 11 also supports a plate 18 provided with a plurality of holes 19 adapted to receive and support the idle mandrels 20.

In use the operator selects a mandrel whose diameter is properly smaller than the inside diameter of the tube, inserts the end 13 of the mandrel 14 between the uprights 23 and under the bar 12 so that the bar will become lodged in the groove 24 to support that end of the mandrel, and then rests the other end upon the support 17. For each tube to be branded the operator raises the end 15 of the mandrel 14, places the tube 16 on the mandrel, replaces the mandrel on the table, and then presses the stamp 21 against the tube 16 at 22. Due to the rigidity of the tube the stamp 21 will flatten the tube at that point to form a flat stamping surface as shown in Figure 3.

My invention permits the use of a single flat stamp for all sizes of tubes.

I have disclosed a specific embodiment of my invention but this disclosure is illustrative only and my invention is not limited thereto.

I claim:

1. The method of branding tubes comprising placing the tube upon a somewhat smaller mandrel, placing said mandrel and the tube upon a support to form a cavity between the upper part of the mandrel and the tube, and pressing a stamp against the tube to form a flat surface while stamping.

2. The method of branding tubes comprising placing the tube upon a bar of such size and shape as to form a cavity between said bar and the tube, removably supporting the bar at one end with the tube thereon and resting the other end upon a support, and pressing a stamp against the tube where the cavity has been formed to form a flat surface while stamping.

3. The method of branding tubes comprising placing the tube upon a bar of such size and shape as to form a cavity between said bar and the tube when the latter is placed upon a supporting surface and pressing a stamp against the tube at that point to form a flat surface while stamping.

In testimony whereof I have signed my name to the above specification.

DANIEL E. HENNESSY.